United States Patent

Krambrock

[11] 3,929,379
[45] Dec. 30, 1975

[54] METHOD AND APPARATUS FOR THE PNEUMATIC CONVEYING OF BULK MATERIAL

[75] Inventor: Wolfgang Krambrock, Ravensburg, Germany

[73] Assignee: Waeschle Maschinenfabrik GmbH, Ravensburg, Germany

[22] Filed: Jan. 30, 1974

[21] Appl. No.: 437,910

[30] Foreign Application Priority Data
Feb. 2, 1973 Germany............................ 2305030

[52] U.S. Cl. ....................... 302/24; 302/29; 302/66
[51] Int. Cl.² .......................................... B65G 53/16
[58] Field of Search ........................ 302/24, 29–31, 302/64, 66

[56] References Cited
UNITED STATES PATENTS

| | | | |
|---|---|---|---|
| 1,248,851 | 12/1917 | Heisler................................. | 302/24 |
| 1,971,853 | 8/1934 | Ihlefeldt............................... | 302/29 |
| 2,897,005 | 7/1959 | Wiltse................................. | 302/24 |
| 3,240,531 | 3/1966 | Lippert et al........................ | 302/24 |
| 3,604,758 | 9/1971 | Flain et al............................ | 302/24 |
| 3,759,578 | 9/1973 | Muschelknautz et al............ | 302/29 |

FOREIGN PATENTS OR APPLICATIONS

| | | | |
|---|---|---|---|
| 17,813 | 11/1955 | Germany.............................. | 302/24 |
| 449,393 | 9/1927 | Germany.............................. | 302/24 |

*Primary Examiner*—Evon C. Blunk
*Assistant Examiner*—Jeffrey V. Nase
*Attorney, Agent, or Firm*—Donald D. Jeffery

[57] ABSTRACT

Conveyor gas is drawn from a material conveyor conduit, upstream of the introduction of material into the conveyor gas flow, and passed through a by-pass conduit. The by-pass conduit is connected to the conveyor conduit at spaced positions along the length thereof, and non-return valves are provided at each of the connections and are closed in normal conveying operation. If material begins to accumulate in the conveyor conduit, resulting in the pressure in the conveyor conduit downstream of the accumulation decreasing by more than a given amount below the pressure in the by-pass conduit, a valve downstream of the beginning of the accumulation is opened to direct gas from the by-pass into the conveyor conduit, to break up the accumulation. The valves can also close the by-pass conduit at the same time as they produce the gas transfer into the conveyor conduit.

17 Claims, 9 Drawing Figures

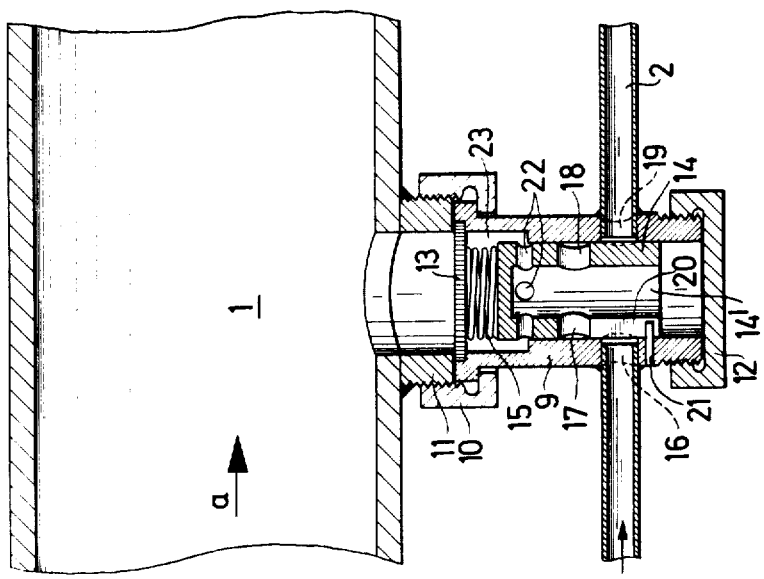
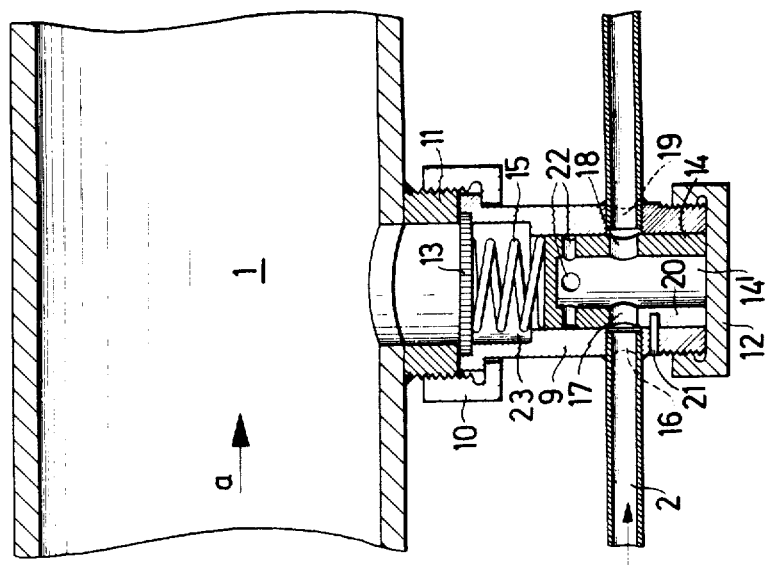

METHOD AND APPARATUS FOR THE PNEUMATIC CONVEYING OF BULK MATERIAL

BACKGROUND OF THE INVENTION

When conveying bulk materials through pipes or conduits by means of a carrier gas, such as atmospheric air, it is desirable to convey as large a through-put of material as possible, with the smallest possible amount of gas. This can give the advantage that small gas compressors and conduits and small matter separators or dust traps can be used. Low speeds of flow reduce wear on the conduits, and damage to the particles of material being conveyed. However, if the speed of flow in the conveyor conduit falls below a minimum speed, material is deposited out of the gas flow, and the depositied material can easily pile up and can form a blockage which completely blocks the conveyor conduit.

In order to counteract this, conveyor methods and apparatuses have already been proposed, based on the principle of providing a further conduit which is parallel to the conveyor conduit and which has communications therewith at greater or smaller spacings, so as to break up such material blockages by the injection of clean gas from the further conduit into the conveyor conduit at positions spaced along the conduit.

In one such apparatus, disposed within a conveyor conduit for conveying material is a perforated tube which is closed at one end and through the apertures in the wall of which air under elevated pressure is continuously blown into the conveyor conduit. The individual jets of gas from the perforations are intended to swirl up any deposits in the conveyor conduit, and thus prevent blocking of the conduit. However, a considerable amount of gas has to be passed into the conveyor conduit over the entire length thereof to achieve this effect, and therefore the speed of gas flow through the conveyor conduit increases towards the downstream end thereof, thus increasing the cost of conveying bulk material due to the amount of gas consumed. In addition, the tube tends to increase in length due to the friction of gas and material passing through it, and it can also become entangled, blocking the conveyor conduit.

Another apparatus has a conveyor conduit which is perforated or which comprises gas pervious material, and which is surrounded by a second outer pipe of larger diameter. Gas is introduced under pressure into the space between the conveyor conduit and the outer pipe, so that gas flows through the wall of the conveyor conduit into its interior. In this apparatus also, an additional amount of gas is passed into the conveyor conduit over the entire length thereof, so that the speed of gas flow in the conduit continuously increases in the downstream direction of length.

In another such apparatus, a by-pass conduit extends parallel to the conveyor conduit and is connected thereto by way of a large number of consecutive open connections, such as short interconnecting pipe members. When a plug of material is formed in the conveyor conduit and blocks it, conveyor gas flows out of the conveyor conduit portion which is upstream of the blockage, as viewed in the direction of material conveyance, so that the blockage is by-passed by way of the by-pass conduit. At each point of connection between the conveyor and the by-pass conduits, the blockage of material is bombarded by flows of gas through the open connection, to cause the blockage to be broken up into a plurality of successive individual portions, which can then be carried away by the gas flow. This apparatus can only be used for dealing with bulk materials which flow easily. This is because, when conveying fine cohesive materials, a considerable amount of material always tends to flow into the by-pass conduit so that the conduit becomes blocked. In addition, this arrangement provides for steps to be taken to relieve the blockage, only after the blockage has already occured in the conveyor conduit.

SUMMARY OF THE INVENTION

An object of the present invention is to prevent the formation of a blockage occuring in pneumatic conveying, while the blockage is in the course of actually being formed, and thereby to prevent a rise in conveyor gas pressure and subsequent stagnation of the conveying process.

A further object of the present invention is to reduce the amount of gas required for pneumatic conveying, while also providing a blockage-freeing function.

Yet another object of the invention is to reduce the minimum gas flow speed required for reliable conveying of material to be conveyed.

With these and other objects in view, the method of the invention provides tapping gas from the conveyor conduit, upstream of the position on the conveyor conduit at which material is introduced into the gas flow, and passing the tapped-off gas flow into a by-pass conduit. The by-pass conduit has connections to the conveyor conduit, spaced in the direction of the length thereof, and non-return valves are provided at the connections. The valves are all closed and the pressure distribution in the by-pass conduit is substantially equated to the pressure distribution which occurs in trouble-free pneumatic conveying in the conveyor conduit, while, when there is a pressure difference in excess of a selected threshold value, as between the by-pass conduit and the conveyor conduit, such pressure difference being caused by a pressure drop in the conveyor conduit due to a forming blockage or accumulation of material, gas is transferred from the by-pass conduit into the conveyor conduit to loosen up the accumulation of material, the gas transfer occurring by opening of the non-return valve at the connection next following the upstream end of the accumulation of material.

The apparatus includes a conveyor conduit and preferably substantially parallel thereto a by-pass conduit which is connected to the conveyor conduit by a plurality of connectors which are spaced from each other in the longitudinal direction of the two conduits. Each of the connectors has a non-return valve, while material to be conveyed is introduced into the conveyor conduit at a position downstream of the position at which conveyor gas is introduced into the conduit. The by-pass conduit is connected to the conveyor conduit at a position between the introduction of conveyor gas and the introduction of material to be conveyed, so that the gas flowing in the by-pass conduit is clean gas, without any material entrained thereby. Both the conveyor conduit and the by-pass conduit can open into a common chamber, or the by-pass conduit can have a cross-sectional area which continuously or stepwise increases in its downstream direction, or alternatively screen or shield plate members can be provided in the by-pass conduit, all these measures being intended to ensure that the pressure distribution in the by-pass conduit is substantially equated to the pressure distribution in the conveyor conduit. When however a pressure drop occurs in the conveyor conduit downstream of an accumulation of material, the pressure difference as between the by-pass conduit and the conveyor conduit, that is to say, the increased relative pressure in the by-pass conduit, will cause one or more of the non-return valves in the connectors to open, but only the valve or valves downstream of the upstream end of the accumulation, so that a restricted flow of pressurised gas will be passed into the by-pass conduit through the connector or connectors, to break up the accumulation of material, while the accumulation is actually being formed.

While the non-return valve in each of the connectors can be a simple ball valve, there is advantage in each non-return valve being in the form of a combination valve comprising a non-return valve member and a stop or shut-off valve member, so arranged that when the non-return valve member opens, the associated shut-off valve member closes the by-pass pipe at the respective connector, so that no more gas can flow through the by-pass conduit, downstream of the respective connector. This causes the full pressure of the gas flow in the by-pass conduit to be applied through the connector or connectors to the accumulation of material in the conveyor conduit. The combination valve can comprise a housing secured to the conduit, with the by-pass conduit through-flow passage passing therethrough, and a piston displaceable within the housing, the piston having a plurality of passages so that in a first position of the piston, gas flows directly through the by-pass conduit but cannot flow into the conveyor conduit, while in a second position of the piston, gas cannot flow in the downstream direction through the by-pass conduit, beyond the respective valve, but can only flow through the passages in the piston and thence into the conveyor conduit.

BRIEF DESCRIPTION OF THE DRAWINGS

FIG. 3 shows a view in longitudinal cross-section of a combination valve, shown in a rest condition, as provided at a connection between the two conduits, FIG. 4 shows a view in longitudinal cross-section of the combination valve of FIG. 1, in an operative position.

DESCRIPTION OF THE PREFERRED EMBODIMENT

Figure 1:
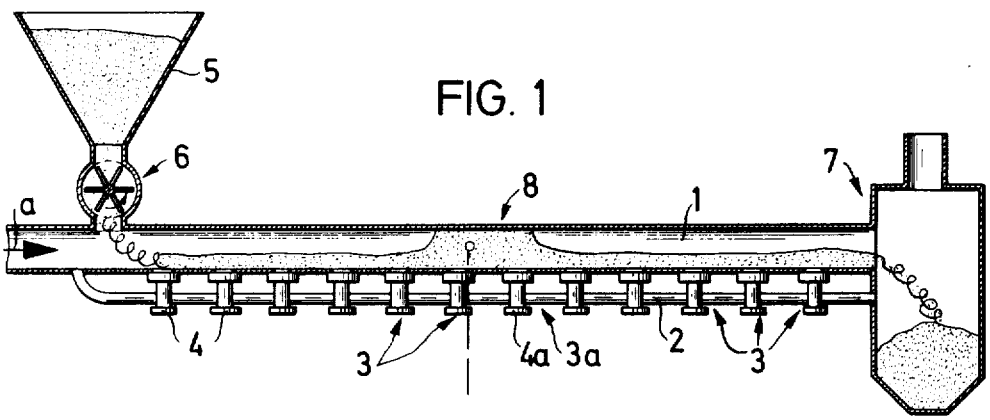
FIG. 1 shows a diagrammatic view in longitudinal cross-section of a conveyor apparatus with a conveyor conduit and a by-pass conduit parallel thereto.

Referring firstly to FIG. 1, the apparatus has a material conveyor conduit 1 and parallel thereto a by-pass conduit 2 which is in communication with the conveyor conduit 1 by connections 3 at a plurality of spaced positions; the spacing of the connections 3 depends on the material to be conveyed and is generally from about 1 to 40 times the diameter or transverse dimension of the conveyor conduit. Each of the connections 3 has a non-return valve 4, the valves being arranged to open to allow a gas flow into the conveyor conduit 1 from the by-pass conduit 2, when there is a given local pressure difference between the by-pass conduit 2 and the conveyor conduit 1, but preventing a gas flow in the opposite direction.

For introducing material into the conveyor conduit, there is a material storage container or hopper 5 with a metering means 6 connected thereto. The material introduced is to be conveyed in the conduit 1 in the direction of arrow $a$ by a compressed flow of gas, such as atmospheric air, supplied by a compressor (not shown).

The by-pass conduit 2 is also connected to the conveyor conduit 1 upstream (as viewed in the direction $a$ of material conveyance) of the intake aperture from the metering means 6, so that clean gas flows through the conduit 2, while both conduits 1 and 2 open into a separator 7. The proportion of gas which flows into and through the by-pass conduit 2, relative to the total amount of gas introduced into the conveyor conduit, is preferably in the region of from 1 to 30 percent. Thus the pressure is equal in the two conduits, at their upstream ends and at the downstream ends respectively. In order to equate or adapt the pressure distribution over the length of the by-pass conduit to an ideal pressure distribution in the conveyor pipe 1, which latter distribution is determined by the normal conveying resistance to conveying afforded by the material in trouble-free conveying operation, the cross-section of the by-pass conduit can be continuously or stepwise enlarged over its length, according to the cross-sectional configuration of the conveyor conduit 1. For making slight corrections to pressure distribution, screen or shield plates, which are preferably adjustable, could also be fitted into the by-pass conduit 2.

Figure 2:
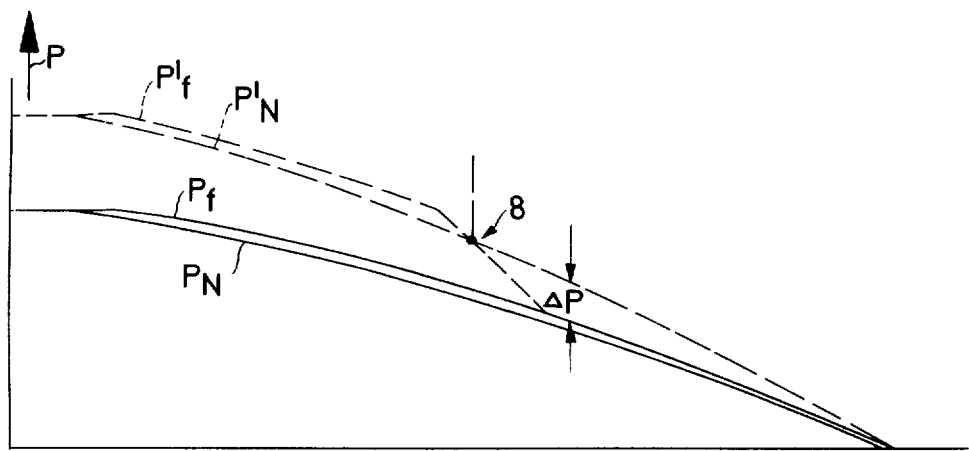
FIG. 2 shows a diagram of pressure distribution in the two conduits.

FIG. 2 shows a graph which indicates pressure distribution P over the length L of the conduits, curve $P_f$ representing the ideal pressure distribution in the conveyor conduit 1 when material is being conveyed therein normally and without any trouble, and curve $P_N$ represents the pressure distribution in the by-pass conduit 2, which latter distribution is substantially adapted or equated to that in the conduit 1. If however there occurs a build-up of material in the conveyor conduit 1, for example as shown at position 8 (see also FIG. 1), the two curves, as regards pressure distribution over the section upstream of the blockage position 8, viewed in the direction $a$ of conveyance, are firstly displaced upwardly in the direction of axis P; the pressure distribution in the by-pass conduit 2 is now represented by curve $P'_N$ while the pressure distribution in the conveyor conduit 1 is represented by the curve $P'_f$. However, at the blockage position 8, the latter curve drops more or less sharply, so that there is a pressure difference $\Delta P$ as between the by-pass conduit 2 and the conveyor conduit 1 downstream of the blockage point 8. As soon as the pressure difference $\Delta P$ exceeds the threshold value of the non-return valve $4a$ next following the blockage position 8, that valve is opened, and gas passes in a jet through the valve from the by-pass conduit 2 into the conveyor conduit 1, and the injection of gas causes the concentration of material at the blockage position 8 to be broken up as it is forming. The levels of pressure distributions in the conduits are therefore restored to their earlier conditions corresponding to curves $P_f$ and $P_N$, the non-return valve $4a$ is closed, and the operation of conveying material resumes its normal mode, until a fresh blockage of material is formed, possibly at another point, such fresh blockage then being removed in a similar manner. When the material forms a blockage which extends over a plurality of connections 4, the blockage is then broken up in a stepwise manner, by the jets of clean gas passing through the respective consecutive valves 4, in succession in the direction of conveyance of material through the conveyor conduit. The non-return valve 4 next following the blockage of material in the downstream direction $a$ allows gas to flow from the by-pass conduit into the conveyor conduit, until the same pressure prevails in both conduits. The valve then moves back into its starting closed position and clean gas flows on through the by-pass conduit to the next valve, as viewed in the direction of conveyance, where the above-described operation of clearing the blockage is repeated. In this way a flow of gas can be introduced into the blockage of material in succession over its entire length, which results in dilution and breaking up of the accumulated material.

It should be noted that, when the valves 4 are simple non-return valves, the transfer of clean gas from the by-pass conduit 2 into the conveyor conduit 1 is not restricted to the connection $3a$ next following the blockage of material. In such a case, gas will also pass from the by-pass conduit into the conveyor conduit 1 through some of the following valves, as long as there is still a corresponding pressure difference $\Delta P$, so that a greater through-flow of gas occurs.

To obviate this, the apparatus can have valves which are formed as a combination of non-return and stop or shut-off valve. Such a valve is described hereinafter with reference to FIGS. 3 and 4.

The valve has a valve housing 9 fixedly secured for example by a cap nut 10 onto a pipe connection or stub 11 in the side of the conveyor conduit 1. At its end remote from the conduit 1 the valve housing 9 is closed by a screwed cover 12, while at the end towards the pipe connection 11, the valve housing 9 carries a filter plate 13 of gas-pervious material secured between the pipe connection 11 and the housing 9. Carried in a bore in the housing 9 is a hollow valve member in the form of a piston 14 which is closed at one end, being its end towards the filter plate 13, and which is held in a rest position (FIG. 3) by a closing spring 15. The housing 9 is so connected into the by-pass conduit 2 that in the rest position of the piston 14 a straight through-passage is provided in the by-pass conduit 2 by bore portions 16 to 19 in the conduit 2, the piston 14 and the housing 9. The portion 17 in the wall of the piston 14 which is towards the entrance or upstream end of the by-pass conduit 2 is enlarged by a slot 20. So that the piston 14 can slide axially but cannot rotate in the housing 9, a pin 21 which is secured to the housing 9 projects into the slot 20. Adjacent the closed end of the piston 14, the piston 14 has radial bores 22 which open into the hollow space $14'$ within the piston 14. When the piston is moved from the rest position of FIG. 3 into its other limit, or operative, position of FIG. 4, against the action of the closing spring 15, the bores 22 are brought into communication with an enlarged bore portion 23 in the housing 9.

In the rest position of the valve, as shown in FIG. 3, that is to say, when material is being conveyed in the conveyor conduit without trouble, the clean gas flows through the by-pass pipe 2, by way of bore 16 to 19. Any flow of gas from the by-pass conduit 2 into the conveyor conduit 1 is blocked by the piston 14, since the radial bores 22 are closed by the housing 9.

If however a blockage of material occurs in the conduit 1 upstream of the valve, and the pressure difference caused thereby, as between the by-pass conduit 2 and the conveyor conduit 1, exceeds the threshold value as determined by the force of the spring 15, the piston 14 is displaced against the pressure of the closing spring 15 into the position of FIG. 4, and the radial bores 22 in the piston 14 open the communication between the by-pass conduit 2 and the conveyor conduit 1, by way of the slot 20, the hollow interior $14'$ of the piston 14, the enlarged bore portion 23 of the housing, and the pipe connection 11. At the same time the bore portion 18 in the wall of the piston 14 which is towards the exit or downstream end of the by-pass conduit 2 is moved out of its FIG. 3 position of alignment with the bore portion 19 in the corresponding wall of the housing 9, so that the straight through-passage in the by-pass conduit 2 is closed. Thus the full flow of clean gas in the conduit 2 passes from the conduit 2 into the conveyor conduit 1 and is entirely available (see FIG. 4) for breaking up the concentration of material forming the blockage. As soon as the pressure difference between the two conduits 1 and 2 has dropped, after the concentration of material has been broken up, the piston 14 is returned to its rest position by the spring 15.

The filter plate 13 prevents material from passing into the valve passages and ultimately clogging the passages, when the valve is operative.

Figure 5:
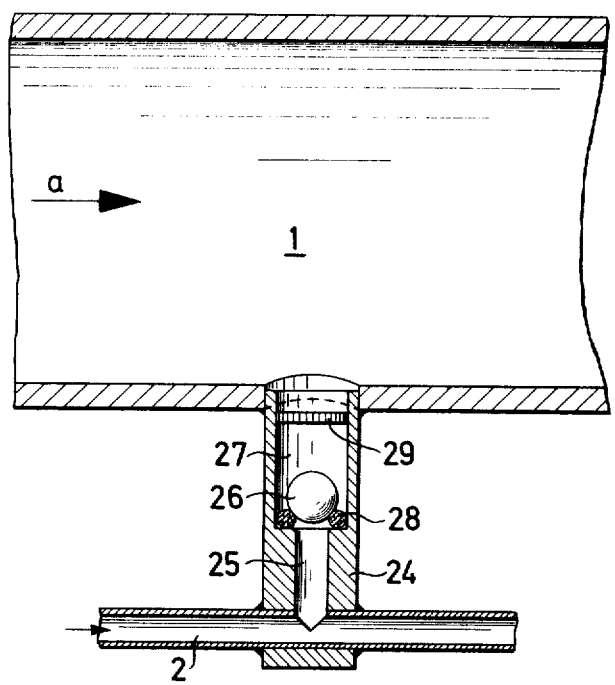
FIG. 5 shows a view in cross-section through a simplified valve which can only carry out a part of the function performed by the combination valve shown in FIGS. 3 and 4.

With the above-described construction, it is possible, with a moderate total amount of carrier gas, to maintain a regular conveyance of material, with quite low fluctuations in conveying pressure. If a somewhat higher expenditure on carrier gas can be accepted, it is possible to keep the cost on structure of the apparatus lower, by using simple non-return valves. FIG. 5 shows a ball valve which is suitable for this purpose. The valve has a valve housing 24 which is secured to the conduit 1 and which has the by-pass conduit 2 passing through it. The housing 24 has a passage 25 which can be closed by a ball valve member 26 disposed in an enlarged passage portion 27 which is towards the conveyor pipe 1. In the valve closed position the ball valve member rests on a seal formed for example by a round cord or ring 28. In this construction also there is a filter plate 29 between the valve housing 24 and the conveyor conduit 1.

When the ball valve member 26 is lifted, the valve permits clean gas to pass from the by-pass conduit into the conveyor conduit, when the pressure difference between the two conduits, as a result of a blockage of material, exceeds a given threshold value which in this case is determined by the weight of the ball. If desired, a spring can be included in the valve to load the ball valve member 26 towards the closed position, to increase the pressure difference at which the valve opens. When, after the blockage of material has been removed, the pressure difference again falls below the threshold value, the ball valve member returns to its closed position.

A disadvantage with this arrangement is that the gas can continue to flow into the conduit 1, and at the same time all the valves downstream of the material blockage are opened, as long at least as there is a sufficient pressure difference, so that a considerable part of the clean gas flowing in the by-pass conduit 2 is passed into the conduit 1 at connections 3 at which there is no blockage of accumulated material, so that that part of the gas flow in the conduit 2 cannot be used for removing the blockage of material. Nonetheless, substantially greater through-puts can generally be achieved with the same conveying pressure and the same amount of gas, in comparison with simple smooth or plain conveyor pipes.

FIGS. 6–9 show various ways of equating the pressure distribution in the by-pass conduit to the pressure distribution in the conveyor conduit 1.

Figure 6:
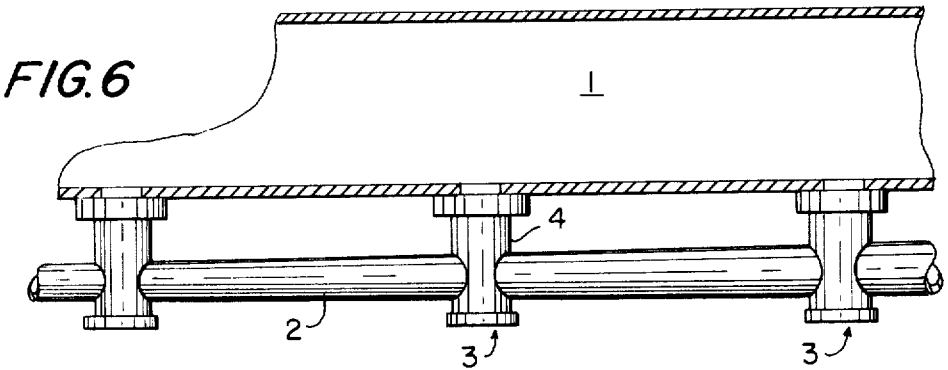
FIG. 6 is a longitudinal section on an enlarged scale of part of the conveyor conduit and the by-pass conduit, in which the cross-sectional area of the by-pass conduit is increased in a step-wise manner.

In FIG. 6, the cross-sectional area of the by-pass conduit 2 is increased stepwise, at the downstream side of each of the connections 3. This therefore provides the variation in the cross-sectional area of the by-pass conduit 2, in order to equate or adapt the pressure distribution over the length of the by-pass conduit to an ideal pressure distribution in the conveyor pipe 1.

Figure 7:
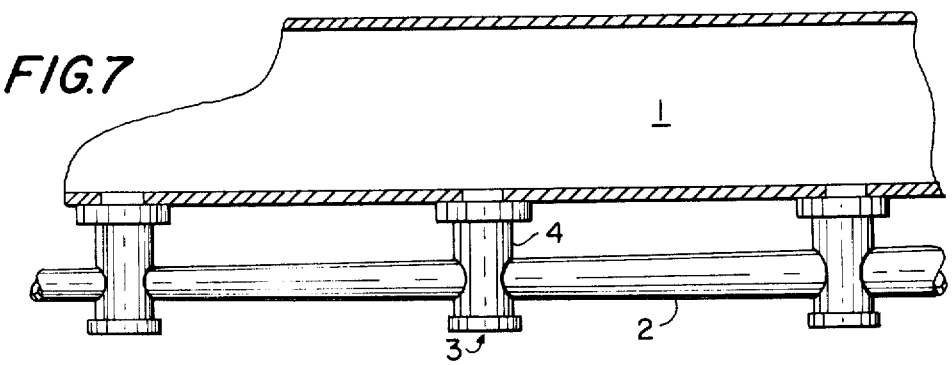
FIG. 7 is a view similar to FIG. 6, illustrating a continuous increase in the cross-sectional area of the by-pass conduit.

FIG. 7 shows that the variation in the cross-sectional area of the by-pass conduit 2 can be a continuous variation, the size of the conduit 2 increasing gradually from the left to the right of FIG. 7.

Figure 8:
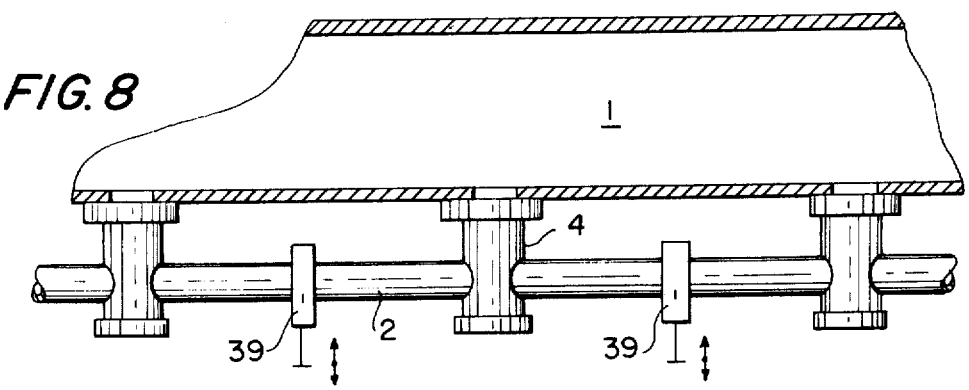
FIG. 8 is a view similar to FIG. 6 in which the by-pass conduit includes screen or shield means distributed over the length of the conduit.

FIG. 8 shows screen or shield plates 39 which are provided for making slight corrections to pressure distribution, the plates preferably being adjustable transversely to the direction of flow of gas through the by-pass conduit 2, as indicated by the double-headed arrows adjacent the screen or shield plates.

Figure 9:
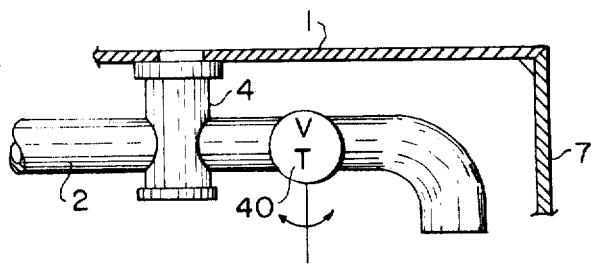
FIG. 9 shows an end portion of the by-pass conduit, including a gas flow throttle valve adjacent the end of the by-pass conduit.

FIG. 9 shows the downstream end of the by-pass conduit 2 opening, for example, to atmosphere. A gas flow-throttling means such as valve 40 is provided adjacent the end of the by-pass conduit 2, to restrict the outlet flow of gas from the conduit 2. The valve 40 is preferably adjustable, for adjustably throttling the gas flow.

The above-described arrangements and mode of operation may also be used to advantage in conveyor apparatuses in which, as a result of unfavourable conveyor conduit runs, due to structural requirements, for example due to a large number of successive conduit bends, there is a danger of a local blockage at certain positions along the conduit. In that case it is only necessary to connect each part of the conveyor conduit which is likely to be threatened by a blockage, by means of an appropriate valve, to the by-pass conduit which is otherwise plain, i.e. without valves. In such an arrangement of conduits and valves the by-pass conduit can then be reconnected into the conveyor conduit directly downstream of the part likely to suffer a blockage, or the last of such parts.

It will be seen from the foregoing description that a part of the conveyor gas is diverted from the conveyor conduit and does not participate in the conveying process, at least over the critical part of the conveyor section, in which a blockage is likely to occur, unless some of the diverted gas flow is required for loosening a blockage in the conveyor conduit. But even in that case, a portion of the gas in the by-pass conduit may remain unused for blockage removal, as the by-pass conduit advantageously carries a gas flow in excess of that required for reliably loosening even an accumulation of blockages. For the purpose of adapting the pressure distribution in the by-pass conduit to desired distribution in the conveyor pipe, the above-mentioned remaining portion of the gas in the by-pass conduit preferably flows into the same container, that is to say the separator 7 in FIG 1, as the gas flowing in the conveyor conduit. Alternatively the gas flow in the by-pass conduit can be returned to the conveyor conduit downstream of the critical part thereof. It would also be possible for the gas flow in the by-pass conduit to be discharged, with suitable throttling, into the open air.

It has been found that, with the early removal of conveyor gas from the conveyor pipe conduit upstream of the intake of material to be conveyed, the total gas through-flow can be reduced to a fraction of the amount which is otherwise usually required. At the same time only minor fluctuations in pressure generally occur during conveying, while even strongly cohesive materials which tend to form deposits on the conduit walls, can be conveyed at low gas flow velocities.

I claim:

1. An apparatus for the pneumatic conveying of bulk material, comprising a conveyor conduit; means for introducing conveyor gas into the conveyor conduit; means for introducing material to be conveyed into the conveyor conduit at a position downstream of the introduction of the conveyor gas; a by-pass conduit disposed adjacent said conveyor conduit; means to introduce gas into said by-pass conduit; means effective to substantially equate pressure distribution in the by-pass conduit to pressure distribution which occurs in the conveyor conduit in normal trouble-free pneumatic conveying; a plurality of connecting means connecting the by-pass conduit and the conveyor conduit at a plurality of positions spaced along the lengths thereof; and non-return valve means at each of said connecting means and individually openable for a flow of gas from the by-pass conduit into the conveyor conduit when the pressure in at least a part of the by-pass conduit is higher than the pressure in the conveyor conduit by a predetermined amount, each of said non-return valve means comprising a non-return valve and a shut-off valve operatively associated with said non-return valve, the shut-off valve being operable to close the by-pass conduit when the respective non-return valve is moved into its open position.

2. A method for the pneumatic conveying of bulk material, wherein conveyor gas is introduced into a conveyor conduit, wherein material to be conveyed is introduced into the conveyor conduit at a position downstream of the position of introduction of the conveyor gas, wherein gas is drawn from the conveyor conduit at a position between the position of introducing the conveyor gas and the position of introducing the material, and passed through a by-pass conduit which has communications with the conveyor conduit at a plurality of spaced positions, the pressure distribution in the by-pass conduit being substantially adapted to the pressure distribution which occurs in normal trouble-free conveying operation in the conveyor conduit, and wherein, when the pressure difference between the by-pass conduit and the conveyor conduit exceeds a preselected threshold value, due to a pressure drop in the conveyor conduit downstream of gas flow-impeding accumulation of material in the conveyor conduit, gas is transferred from the by-pass conduit into the conveyor conduit at the respective communication position which is next downstream of the accumulation of material, for loosening the accumulation, and wherein, when gas is transferred from the by-pass conduit into the conveyor conduit at said communication position, the flow of clean gas through the by-pass conduit is blocked at said communication position.

3. A method according to claim 2 wherein the proportion of gas drawn from the conveyor conduit and passed into the by-pass conduit, relative to the total amount of gas introduced into the conveyor conduit, is from 1 to 30%.

4. An apparatus for the pneumatic conveying of bulk material, comprising a conveyor conduit; means for introducing conveyor gas into the conveyor conduit; means for introducing material to be conveyed into the conveyor conduit at a position downstream of the introduction of the conveyor gas; a by-pass conduit connected to the conveyor conduit between the gas-introducing means and the material-introducing means, whereby a portion of the gas introduced into the conveyor conduit is passed without conveyed material through the by-pass conduit; means effective to substantially equate pressure distribution in the by-pass conduit to pressure distribution which occurs in the conveyor conduit in normal trouble-free pneumatic conveying; a plurality of connecting means connecting the by-pass conduit and the conveyor conduit at a plurality of positions spaced along the lengths thereof; and non-return valve means at each of said connecting means and individually openable for a flow of gas from the by-pass conduit into the conveyor conduit when the pressure in at least a part of the by-pass conduit is higher than the pressure in the conveyor conduit by a predetermined amount, each of said non-return valve means comprising a non-return valve and a shut-off valve operatively associated with said non-return valve, the shut-off valve being operable to close the by-pass conduit when the respective non-return valve is moved into its open position.

5. Apparatus according to claim 4 wherein each of said non-return valve means is a ball valve.

6. Apparatus according to claim 4 wherein a filter member of gas-pervious material is provided at each of said connecting means, for preventing material from flowing from the conveyor conduit into the by-pass conduit.

7. Apparatus according to claim 4 wherein said means for substantially equating pressure distribution in the by-pass conduit and pressure distribution in the conveyor conduit comprises a chamber into which the downstream ends of both the conveyor conduit and the by-pass conduit open.

8. Apparatus according to claim 4 wherein said pressure distribution equating means includes an increase in the cross-sectional area of the by-pass conduit over the length thereof.

9. Apparatus according to claim 8 wherein the cross-sectional area of the by-pass conduit increases continuously over the length thereof.

10. Apparatus according to claim 4 wherein said pressure distribution equating means includes screen means in the by-pass conduit.

11. Apparatus according to claim 4 wherein the distance between each two said connecting means is from one to forty times the transverse dimension of the conveyor conduit.

12. Apparatus according to claim 4 wherein the by-pass conduit and the conveyor conduit are connected together by said connecting means only in portions of the conduits which are critical as regards possible disposition and accumulation of material in the conveyor conduit.

13. Apparatus according to claim 12 wherein said by-pass conduit opens to the exterior downstream of said most downstream critical position, by way of a gas flow-throttling means.

14. Apparatus according to claim 4, further including, at each said connecting means, a valve assembly comprising a non-return valve and a shut-off valve combined to form a structural unit.

15. Apparatus according to claim 14 wherein said structural unit comprises a housing having a main bore, a valve piston member displaceable in the main bore between a non-return-valve open and valve-closed position, a spring urging the valve piston member towards the valve-closed position, first passage means in the valve piston member and arranged to carry a gas flow from the by-pass conduit through the valve piston member and thereby in a downstream direction through the by-pass conduit when the valve piston member is in the valve-closed position, and second passage means in the valve piston member and arranged to divert the gas flow from the by-pass conduit into the conveyor conduit when the valve piston member is in the valve-open position, the first passage means being opened when the second passage means is closed and vice-versa.

16. Apparatus according to claim 15 wherein said main bore has a first end in gas flow communication with the conveyor conduit and a second end which is closed; the main bore has an enlarged bore portion at its said first end; the valve piston member is non-rotatable in the main bore and is hollow, with its end which is towards the said first end of the main bore being closed; wherein the housing wall has a first bore which is open into the main bore and to which a part of the by-pass conduit upstream of the valve assembly is connected, and a second bore which is also open into the main bore and to which a part of the by-pass conduit downstream of the valve assembly is connected; the valve piston member has in the wall thereof a first through-bore opening into its hollow interior, and a second through-bore also opening into its hollow interior and substantially oppositely positioned to the first through-bore; the valve piston member has an axially extending slot in its wall, communicating with the first through-bore; and the valve piston member has radially extending through-bore means adjacent said closed end so that when the valve piston member is in its valve-closed position, said radial through-bore means communicates with the enlarged portion of the main bore, whereby in said valve-closed position gas can flow from said upstream part of the by-pass conduit through the first bore in the housing, the first through-bore in the valve piston member, the hollow interior of the valve piston member, the second through-bore in the valve piston member and the second bore in the housing and thence into the downstream part of the by-pass conduit, but no gas can flow into the enlarged portion of the main bore and into the conveyor conduit, and whereby in the valve-open position the first and second through-bores in the valve piston member are out of alignment with the first and second bores in the housing and gas flowing from said upstream part of the by-pass conduit can flow through the first bore in the housing, the slot in the valve piston member, the hollow interior of the valve piston member, said radial through-bore means, and said enlarged portion of the main bore and thence into the conveyor conduit, but no gas can flow into the downstream part of the by-pass conduit.

17. Apparatus according to claim 16 wherein said housing carries a projection directed radially inwardly of the main bore and engaging into said slot, for preventing rotary displacement of the valve piston member but permitting axial displacement thereof in the main bore.

* * * * *